(12) United States Patent
Chatenay et al.

(10) Patent No.: US 11,248,662 B2
(45) Date of Patent: Feb. 15, 2022

(54) DUAL CLUTCH UNIT AND DRIVE ASSEMBLY

(71) Applicant: GKN Automotive Limited, Birmingham (GB)

(72) Inventors: Christoph Chatenay, Bonn (DE); Jan Haupt, Kürten (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/042,277

(22) PCT Filed: May 20, 2019

(86) PCT No.: PCT/EP2019/062966
§ 371 (c)(1),
(2) Date: Sep. 28, 2020

(87) PCT Pub. No.: WO2019/219971
PCT Pub. Date: Nov. 21, 2019

(65) Prior Publication Data
US 2021/0054882 A1    Feb. 25, 2021

(30) Foreign Application Priority Data

May 18, 2018    (DE) ..................... 10 2018 112 131.8

(51) Int. Cl.
*F16D 13/72*    (2006.01)
*F16D 13/38*    (2006.01)
(Continued)

(52) U.S. Cl.
CPC ........... *F16D 13/72* (2013.01); *F16D 13/385* (2013.01); *F16D 13/52* (2013.01); *F16D 13/74* (2013.01); *F16D 21/02* (2013.01)

(58) Field of Classification Search
CPC ........ F16D 13/72; F16D 13/385; F16D 13/52; F16D 13/74; F16D 21/02; F16D 25/10;
(Continued)

(56) References Cited

U.S. PATENT DOCUMENTS 2,935,889 A * 5/1960 Adams ..................... F16D 13/74
 74/467
3,734,259 A * 5/1973 Ashfield ................ B60K 17/02
 192/113.34
(Continued)

FOREIGN PATENT DOCUMENTS

DE    11 49 218 B    5/1963
DE    24 33 530 A1   3/1975
(Continued)

OTHER PUBLICATIONS

International Search Report and Written Opinion for PCT/EP2019/062966 dated Sep. 27, 2019 (14 pages; with English translation).

*Primary Examiner* — Mark A Manley
(74) *Attorney, Agent, or Firm* — Bejin Bieneman PLC (57) ABSTRACT

A dual clutch unit includes an outer disk carrier rotationally driven about a rotation axis, first and second inner disk carriers, first and second disk packs for torque transmission between the outer disk carrier and the respective inner disk carrier, wherein the first and second inner disk carriers are arranged rotatably relative to each other about the rotation axis, a central oil supply to supply the first and second disk packs with coolant, a first distributor channel being formed in the first inner disk carrier and comprising a feed opening through which the first distributor channel is fluidly connected to the central oil supply, a second distributor channel being formed in the second inner disk carrier and being fluidly connected to the central oil supply via the first
(Continued)

distributor channel, and drain channels being formed in the inner disk carriers to conduct the coolant into the disk packs.

15 Claims, 4 Drawing Sheets

(51) Int. Cl.
*F16D 13/74* (2006.01)
*F16D 21/02* (2006.01)
*F16D 13/52* (2006.01)

(58) Field of Classification Search
CPC ........... F16D 25/082; F16D 2021/0661; F16D 2300/06; F16D 2021/0692; F16D 25/123; F16H 48/36; F16H 57/0428; F16H 57/043; F16H 57/0483; F16H 57/0473; B60K 17/165
See application file for complete search history.

(56) References Cited

U.S. PATENT DOCUMENTS

| | | |
|---|---|---|
| 2006/0113157 A1 | 6/2006 | Ichikawa et al. |
| 2018/0058513 A1 | 3/2018 | Long et al. |

FOREIGN PATENT DOCUMENTS

| | | |
|---|---|---|
| DE | 10 2008 040 172 A1 | 1/2010 |
| DE | 10 2011 102 748 A1 | 11/2012 |
| EP | 1664567 B1 | 10/2007 |
| WO | 2017157479 A1 | 9/2017 |

\* cited by examiner

DUAL CLUTCH UNIT AND DRIVE ASSEMBLY

CROSS-REFERENCE TO RELATED APPLICATIONS

This application is a national stage of, and claims priority to, Patent Cooperation Treaty Application No. PCT/EP2019/062966, filed on May 20, 2019, which application claims priority to German Application No. DE 10 2018 112 131.8, filed on May 18, 2018, which applications are hereby incorporated herein by reference in their entireties.

BACKGROUND

From WO 2017/157479 A1 a dual clutch unit for variable torque distribution on two output shafts is known. The dual clutch unit has two friction clutches, with each of the two clutches having its own clutch lubrication line.

A dual clutch unit is known from EP 1 664 567 B1, in which a single inner disk carrier is driven and two outer disk carriers are arranged to rotate independently of each other about the common rotation axis. The two disk packs are supplied with coolant and/or lubricant via oil channels integrated in the single inner disk carrier. The coolant and/or lubricant fed from the hub is lead through an oil channel, which is arranged in the inner disk carrier on extension between the two disk packs, radially outwards into axially running ring channels and finally into the two disk packs.

SUMMARY

A dual clutch unit for variable torque distribution on two output shafts includes an outer disk carrier rotationally driven about a rotation axis, a first inner disk carrier, a first disk pack for torque transmission between the outer disk carrier and the first inner disk carrier, a second inner disk carrier, wherein the first inner disk carrier and the second inner disk carrier are arranged rotatably relative to each other about the rotation axis, a second disk pack for torque transmission between the outer disk carrier and the second inner disk carrier. A drive assembly for driving a drive axle of a motor vehicle can include such a dual clutch unit.

However, the friction clutches or multi-disk clutches used are components which are exposed to high temperatures during operation of a motor vehicle. Particularly for disk packs consisting of several disks, namely the inner disks (inner lamella) and outer disks (outer lamella), a cooling for the discs with a coolant and/or lubricant is therefore necessary.

It would be beneficial to provide a dual clutch unit of the type mentioned above, which can absorb very high forces though having a very compact design and low wear and allow for continuous operation when slipping.

This task is solved by the dual clutch unit further comprising a central oil supply to supply the first disk pack and the second disk pack with coolant, a first distributor channel being formed in the first inner disk carrier and comprising a feed opening through which the first distributor channel is fluidly connected to the central oil supply, a second distributor channel being formed in the second inner disk carrier and being fluidly connected to the central oil supply via the first distributor channel, and drain channels being formed in the first inner disk carrier to conduct the coolant into the first disk pack and in the second inner disk carrier to conduct the coolant into the second disk pack.

The coolant serves to cool and/or lubricate the disk packs so that the coolant could also be called an agent for coolant and/or lubricant. Usually an oil containing coolant is used for this purpose.

The first distributor channel, thus, has a dual function, firstly, to supply the first disk pack with coolant and, secondly, to partially transfer coolant to the second distributor channel. Consequently, the second distributor channel is arranged downstream of the first distributor channel in coolant flow direction. Accordingly, the coolant coming from the central oil supply flows first through the first distributor channel and merely a partial quantity of the coolant is led through the first distributor channel into the second distributor channel. Hence, the two distributor channels are connected in series. Connecting the two distributor channels in series in coolant flow direction results in a compact dual clutch unit.

For instance, the first distributor channel can be supplied with coolant via an access from the side. The feed opening can be arranged on an end face of the first inner disk carrier facing away from the second inner disk carrier. The feed opening can be an annular opening arranged concentrically to the rotation axis.

The first distributor channel is arranged in the first inner disk carrier and the second distributor channel is arranged in the second inner disk carrier. The two inner disk carriers are arranged so that they can rotate relative to each other about the common rotation axis, for example in a clutch housing, so that during operation of the dual clutch unit, depending on the driving conditions, the two inner disk carriers can rotate about the rotation axis at different speeds. A rotary transmission leadthrough can be provided so that the first distributor channel can even with speed differences be fluidly connected to the second distributor channel. The first inner disk carrier can have an axial protrusion with at least one through-bore. "Axial" means in the direction of the rotation axis or along the rotation axis, respectively, and in particular parallel to the rotation axis. The second distributor channel can be fluidly connected to the first distributor channel via the at least one through-bore. Accordingly, the coolant coming from the central oil supply first flows through the first distributor channel and a partial quantity of the coolant is passed on through the at least one through-bore into the second distributor channel.

For instance, several of the through-bores extend through the protrusion, especially two, three, four, five, six or more than six through-bores. The through-bores can be circumferentially distributed around the rotation axis. At least one of the through-bore may have an outlet opening on an end face facing the second distributor channel. The protrusion may protrude into the second distributor channel. Thus, the at least one through-bore can in flow direction on the outlet side directly lead into the second distributor channel. In flow direction on the inlet side, the first distributor channel can directly lead into the at least one through-bore. For instance, an outer diameter of the protrusion can be smaller than an outer diameter of the second distributor channel or can be equal to the outer diameter of the second distributor channel. An inner diameter of the protrusion can be larger than an inner diameter of the second distributor channel or can be equal to the inner diameter of the second distributor channel. The second distributor channel can be designed as an axially extending annular passage at least in a region of axial overlap with the protrusion, i.e. along the area where the protrusion projects into the second distributor channel. By this, the two inner disk carriers can easily rotate relative to each other about the rotation axis. Thus, the rotary transmission leadthrough can be formed by the protrusion of the first inner disk carrier with the at least one through-bore and by the second distributor channel along the area of axial overlap with the protrusion.

The first inner disk carrier and the second inner disk carrier are axially supported against each other. This results in a particularly compact design width. A spacer can be arranged axially between the two inner disk carriers. The spacer can be an annular body arranged concentrical to the rotation axis and the two inner disk carriers. Due to possible speed differences between the two inner disk carriers which may occur during operation of the dual clutch unit, the spacer may have a sliding surface. The spacer can be pushed onto the protrusion of the first inner disk carrier. Furthermore, the spacer can have a sealing function and seal the transition area between the first inner disk carrier and the second inner disk carrier to the radially outside. "Radial" means along an axis that lies in a plane perpendicular to the rotation axis. The spacer can be made of a bronze material, a bronze-based material, a sintered material, especially sintered bronze, or similar material.

The first distributor channel and/or the second distributor channel can each be designed as an annular passage extending in the axial direction and arranged concentrically to the rotation axis. Due to centrifugal forces, the coolant is pressed against a radially outer channel wall of the respective distributor channel. As an alternative to the design of the first distributor channel and/or the second distributor channel as an annular passage, the first inner disk carrier and/or the second inner disk carrier may have several distributor channels circumferentially distributed around the rotation axis. Thus, several of the first distributor channels and/or several of the second distributor channels can be provided. The distributor channels can each be designed as bores extending in the axial direction. In order to produce a flow of the coolant during rotation of the respective inner disk carrier the distributor channels designed as bores can be inclined to the rotation axis. For instance, borehole longitudinal axes of the distributor channels can each form an angle with the rotation axis. The angle can be between 0.01° (degrees) and 10° (degrees). The respective angle preferably opens in coolant flow direction. The borehole longitudinal axes of the distributor channels can have said same angle with the rotation axis. Basically, the angle of the borehole longitudinal axes of the distributor channels in the first inner disk carrier to the rotation axis can also differ from the angle of the longitudinal axes of the distributor channels in the second inner disk carrier to the rotation axis.

In the radially outer channel wall of the first distributor channel and in the radially outer channel wall of the second distributor channel outlet openings may be formed which lead to the drain channels of the respective inner disk carrier. Particularly good results with regard to uniform cooling and/or lubrication of the two disk packs were achieved when the outlet openings are arranged on an imaginary spiral arranged concentrically to the rotation axis. During operation of the dual clutch unit it has been noticed that the supply of coolant via the feed opening of the first distributor channel laterally arranged on the first inner disk carrier can lead to an oversupply of the first disk pack. In order to adapt the coolant supply locally, the diameter of the outlet openings in the first disk carrier as well as in the second disk carrier can be varied. For instance, the diameter of the all drain channels can be adapted. Furthermore, at least a subset of the outlet openings or the drain channels, respectively, in the first distributor channel can have a smaller diameter than at least a subset of the outlet openings or the drain channels, respectively, in the second distributor channel. The drain channels may run in radial direction.

An envelope surface delimiting the first distributor channel radially outside and/or an envelope surface delimiting the second distributor channel radially outside can be designed frustoconically. The axis of the respective truncated cone may be the common rotation axis around which the two inner disk carriers and the outer disk carrier are rotationally arranged. The respective distributor channel, which can be designed as annular passage, may in coolant flow direction widen to radially outwards. As the distance between the radially outer envelope surface and the rotation axis increases in the axial direction, due to the centrifugal force the coolant flows through the respective distributor channel along the radially outer channel wall in a direction away from the feed opening. For instance, an aperture angle between envelope lines of the respective envelope surface and the rotation axis is between 0.01° (degrees) and 10° (degrees). The respective aperture angle may open in the coolant flow direction.

Instead of the design of the respective distributor channel expanding or widening radially in axial direction, the respective radial outer channel wall of the first distributor channel and/or the second distributor channel can also be aligned parallel to the rotation axis. An archimedean screw can be arranged in each of the distributor channels. Like a worm pump, the archimedean screw can pump the coolant in the respective distributor channel when the respective inner disk carrier rotates. The respective archimedean screw may then in the respective distribution channel be non-rotatably connected to the first inner disk carrier or the second inner disk carrier.

The second distributor channel may be closed at an axial end facing away from the first inner disk carrier. Thus, the coolant can exit the second distributor channel exclusively via the drain channels. It may be preferable that the coolant can leave the first distributor channel exclusively via the drain channels in the first inner disk carrier and via the at least one through-bore. The drain channels can directly abut the respective distributor channel and can be are arranged radially between the respective distributor channel and the associated disk pack.

Furthermore, the first distributor channel may contain guiding means for guiding a partial quantity of the coolant to the at least one through-bore. This ensures that a partial quantity of the coolant always arrives in the second distributor channel which is in flow direction downstream of the first distributor channel, thus, avoiding an undersupply of the second disk pack or an oversupply of the first disk pack. The guiding means may have at least one recess, for instance an elongated recess, such as a groove, flute, channeling or the like. The at least one recess may have a constant depth over its length. The at least one recess may be formed in the radially outer channel wall of the first distributor channel. The at least one recess may extend over at least 20 percent of an axial longitudinal extension of the first distributor channel. The at least one recess may extend over more than 70 percent of the longitudinal extension of the first distributor channel, whereby the at least one recess can extend over the entire longitudinal extension of the first distributor channel. The at least one recess can open into the at least one through-bore. It may be beneficial that each through-bore is assigned one of the recesses. For example, the first inner disk carrier can have several through-bores circumferentially arranged, for instance two, three, four, five, six or more through-bores, whereby into each of the through-bore exactly one recess of the recesses can lead in. Thus the number of through-bores and the number of recesses can be the same.

The at least one through-bore can smoothly merge on its radial outside with the radially outer channel wall, for instance the outer wall or base of the respective recess, in order to provide a continuous or stepless transition between the first distributor channel and the at least one through-bore. A borehole longitudinal axis of the at least one through-bore can form a bore angle with the rotation axis that can be between 0.01° (degrees) and 10° (degrees). For instance, the bore angle and the aperture angle of the envelope lines of the envelope surface of the first distributor channel are identical.

The outer disk carrier can have several discharge channels for discharging the coolant. The coolant, which comes from radially inside via the outlet holes of the inner disk carriers, is guided through the disk packs by centrifugal forces, thereby cools and/or lubricates the individual disks, and finally reaches the outer disk carrier, where it can be discharged radially outside via the discharge channels. At least a subset of the discharge channels along the first disk pack can have a smaller diameter than at least a subset of the discharge channels along the second disk pack. In this way, the coolant supply can be locally adapted to achieve an even lubrication of both disk packs. The coolant discharging from the outer disk carrier can be discharged via a housing wall of a clutch housing of the dual clutch unit, for example, into a sump within the clutch housing. In said sump, it can be fed to the central oil supply via a conveyor device. The conveying device can be, in particular, a pump or a rotating gear wheel with a stripper, whereby the gear wheel is immersed in the sump and the stripper can strip off the coolant.

Furthermore, the dual clutch unit can have a deflector ring. The deflector ring can be on its inlet side connected to the central oil supply and on its outlet side to the first distributor channel. The deflector ring can be arranged concentrically to the rotation axis. The deflector ring may be inserted or pressed into a recess in a clutch housing and may be held stationary relative to the clutch housing. Thus, the deflector ring does not rotate about the rotation axis during operation of the dual clutch unit, but stands still. The deflector ring can have a collecting groove being open in the circumferential direction and several transfer bores, which may be circumferentially distributed and at least essentially axially aligned and fluidly connected to the collecting groove. During operation, the coolant supplied from radially outside to the deflector ring can flow around the deflector ring in the collecting groove and exit the deflector ring in axial direction via the transfer bores. This allows an axially compact design. In way of example, the deflector ring can be a plastic part, for instance an injection-moulded plastic part, although metallic materials are also possible.

A cover can be non-rotatably arranged laterally to the outer disk carrier. In the cover at least one takeover bore can be formed, which fluidly connects the at least one transfer bore of the deflector ring with the first distributor channel. During operation of the dual clutch unit, the cover rotates together with the outer disk carrier about the rotation axis. Due to the speed differences to the stationary held deflector ring, a rotary transmission leadthrough can be provided for fluid connection. For example, the cover may have several takeover bores circumferentially distributed around the rotation axis, whereby the takeover bores of the cover and the transfer openings of the deflector ring may be arranged relative to each other such that during each revolution of the cover about the rotation axis the transfer bores and the takeover bores at least once are temporarily fluidly interconnected with each other. To seal the fluid transition between the deflector ring and the cover, the deflector ring can engage in an annular gap that opens towards the deflector ring. The cover can have an axial protrusion that protrudes into the first distributor channel to seal the fluid transition between the takeover bores and the first distributor channel. The first distributor channel is designed as an axially extending annular passage at least in a region of axial overlap with the protrusion of the cover, i.e. along the region where the protrusion projects into the first distributor channel. In this way, the cover, which is non-rotatably connected to the outer disk carrier, and the first inner disk carrier can rotate at different speeds around the rotation axis. Since speed differences can also occur between the cover and the first inner disk carrier, a rotary transmission leadthrough for fluid connection can also be provided here. Instead of the described arrangement of the cover between the deflector ring and the first inner disk carrier, the deflector ring can also project directly into the first distributor channel, so that a rotary transmission leadthrough can be formed by the axially overlapping areas of the deflector ring and the first inner disk carrier.

The torque between the outer disk carrier and the respective inner disk carrier can be transmitted in both directions. In standard operation, a drive motor rotationally drives the outer disc carrier so that the torque can be transmitted from the outer disc carrier via the first disc pack to the first inner disc carrier and/or via the second disc pack to the second inner disc carrier. When a generator is used in the drive train, for example an electric drive that can be operated as a motor and as a generator, the torque flow can be reversed to recover energy so that torque can be transmitted from the first inner disk carrier via the first disk pack and/or from the second inner disk carrier via the second disk pack to the outer disk carrier.

The dual clutch unit allows a variable torque distribution to the two output shafts of a motor vehicle, for example. There is no need for a differential gearing for distributing torque to the two output shafts. For the variable torque distribution, the dual clutch unit can have two separately controllable friction clutches, whose transmittable torque can be individually and variably adjusted. Depending on the driving conditions, the torque can be individually set at the curve inside wheel and the curve outside wheel respectively, which overall leads to improved driving dynamics and driving stability. When driving straight ahead, both friction clutches can be closed. Speed differentiation when driving through bends can be enabled by slipping of the friction clutches. The tighter the curve is the more slippage there is. When the clutches are closed, this corresponds to a 100 percent lock. By this, the driving force can be infinitely adjusted for each wheel by means of the dual clutch unit. This steering principle is also referred to an active torque distribution or "torque vectoring". Within the context of the driving-dynamic tuning of the motor vehicle, this can specifically be used to reduce the vehicle's unwanted tendency to understeer due to a positive yaw moment. Furthermore, the vehicle dynamics can be positively influenced due to a controlled difference of the rotational speed between the front axle and the rear axle of the vehicle. Similar to a locking differential, the two vehicle wheels can also be connected to one another by synchronously controlling the clutches. This leads to a clearly improved traction and, in the upper speed range it can be used for yaw damping.

A solution of the above-mentioned task further relates to a drive assembly for driving a drive axle of a motor vehicle including a driving machine with a motor shaft, two output shafts arranged concentrically to each other, and a clutch unit arranged in a power path between the driving machine and the two output shafts. The clutch unit is designed according to at least one of the above-mentioned examples. The motor shaft rotationally drives the outer disk carrier, and a first output shaft of the two output shafts is connected to the first inner disk carrier and a second output shaft of the two output shafts is connected to the second inner disk carrier in a rotationally fixed manner. The drive assembly has the same advantages as the dual clutch unit, so that reference is made to the above description.

DETAILED DESCRIPTION

FIGS. 1 to 7, which are described together below, show a dual clutch unit 1, which can also be referred to as a clutch arrangement. The dual clutch unit 1, for instance, is used in a drive train of a motor vehicle for variable torque distribution from an input part, here, an outer disk carrier 2, to two output parts, here, a first inner disk carrier 3 and a second inner disk carrier 4. The outer disk carrier 2 and the two inner disk carriers 3 are rotationally arranged about a rotation axis X. The outer disk carrier 2 can, for example, be rotationally driven via a ring gear. For variable torque distribution, the dual clutch unit 1 has two separately controllable friction clutches 5, 6, whose transmittable torque can be set individually and variably.

Figure 1:
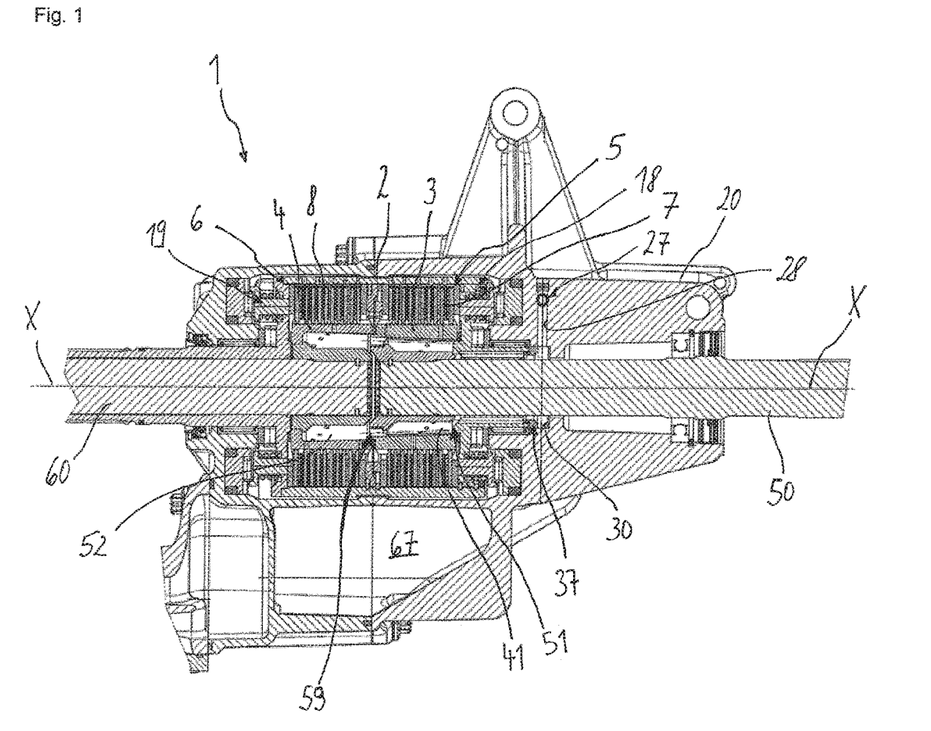
FIG. 1 shows an example dual clutch unit in longitudinal section.

This makes the dual clutch unit 1 suitable for active control of the yaw motion of the motor vehicle or the yaw angle speed. This is achieved by distributing the torque to a right output shaft, also referred to as side shaft 50, and to a left output shaft, also referred to as side shaft 60, of a driven axle differently or by adjusting it selectively, respectively. Such systems for variable torque distribution are also known as "torque vectoring" systems or "active yaw" systems. The steering principle is also referred to as active torque distribution or "torque vectoring".

By way of example, the first inner disk carrier 3 is non-rotatably connected to the right side shaft 50 and the second inner disk carrier 4 to the left side shaft 60 of the driven axle. Accordingly, the two inner disk carriers 3, 4 can also be referred to as clutch hubs.

The two friction clutches 5, 6 are arranged axially adjacent to each other and concentrically to the rotation axis X. They are preferably of the same design with regard to their construction, in particular their geometric dimensions. In more detail, the friction clutches 5, 6 each have a disk pack 7, 8. The first disk pack 7 serves for variable torque transmission between the outer disk carrier 2 and the first inner disk carrier 3, while the second disk pack 8 serves for variable torque transmission between the outer disk carrier 2 and the second inner disk carrier 4. The two disk packs 7, 8 can be individually loaded with force so that the torque to be transmitted to the respective side shaft 50, 60 can be precisely adjusted as required. For this purpose, the disk packs 7, 8 each comprise several outer disks which are rotationally fixed and axially movable with the outer disk carrier 2 and several inner disks which are rotationally fixed and axially movable with the associated inner disk carrier 3, 4, the disks are arranged axially alternately.

The two disk packs 7, 8 can each be loaded axially in direction towards to each other by a respective pressure plate 9, 10 and are each axially supported against a respective supporting element 11, 12. The two supporting elements 11, 12, which are arranged axially between the two disk packs 7, 8, are axially supported against the outer disk carrier 2. The supporting elements 11, 12 are ring-shaped and arranged concentrically to the rotation axis X. The two supporting elements 11, 12 interlock axially and are supported axially against the outer disk carrier 2 independently of each other.

The dual clutch unit 1 has a clutch chamber 13, which is limited radially on the outside by the outer disk carrier 2 and radially on the inside by the two inner disk carriers 3, 4. Furthermore, a right cover 14 and a left cover 15 are provided, which laterally limit the clutch chamber 13. The two covers 14, 15 are non-rotatably connected to the outer disk carrier 2 and each have a central opening 16, 17 to accommodate the right and left side shafts 50, 60. A slide bearing is provided between the covers 14, 15 and the respective side shaft 50, 60. The first disk pack 7, the first supporting element 11, the second supporting element 12 and the second disk pack 8 are accommodated in the coupling chamber 13.

Each of the two friction clutches 5, 6 can be operated individually by an associated actuator unit 18, 19. For this purpose, the two actuator units 18, 19 can be controlled independently of each other by means of a control unit (not shown), so that a first torque that can be transmitted from the first disk pack 7 to the first inner disk carrier 3 and a second torque that can be transmitted from the second disk pack 8 to the second inner disk carrier 4 can be variably adjusted independently of each other. The two actuator units 18, 19 have the same design and function.

The actuator units 18, 19 can be hydraulic or electric actuator units, for instance electrohydraulic, electromotive or electromagnetic actuator units. The actuators are each axially supported on a clutch housing 20 in opposite axial directions. The hydraulically operated actuators, as shown here, each have a ring-shaped piston 21, which sits axially displaceably in an associated ring-shaped cylinder chamber 22 of the clutch housing 20. The laterally arranged covers 14, 15 of the outer disk carrier 2 each have an opening 23 through which the respective piston 21 and the respective pressure plate 9, 10 interact to actuate the respective friction clutch 5, 6. Via not shown oil channels, a hydraulic pump can be used to generate hydraulic pressure so that the respective piston 21 is moved axially in the direction of the disk pack 7, 8. Return springs 24 are provided here to reset the pistons 21.

Figure 3:
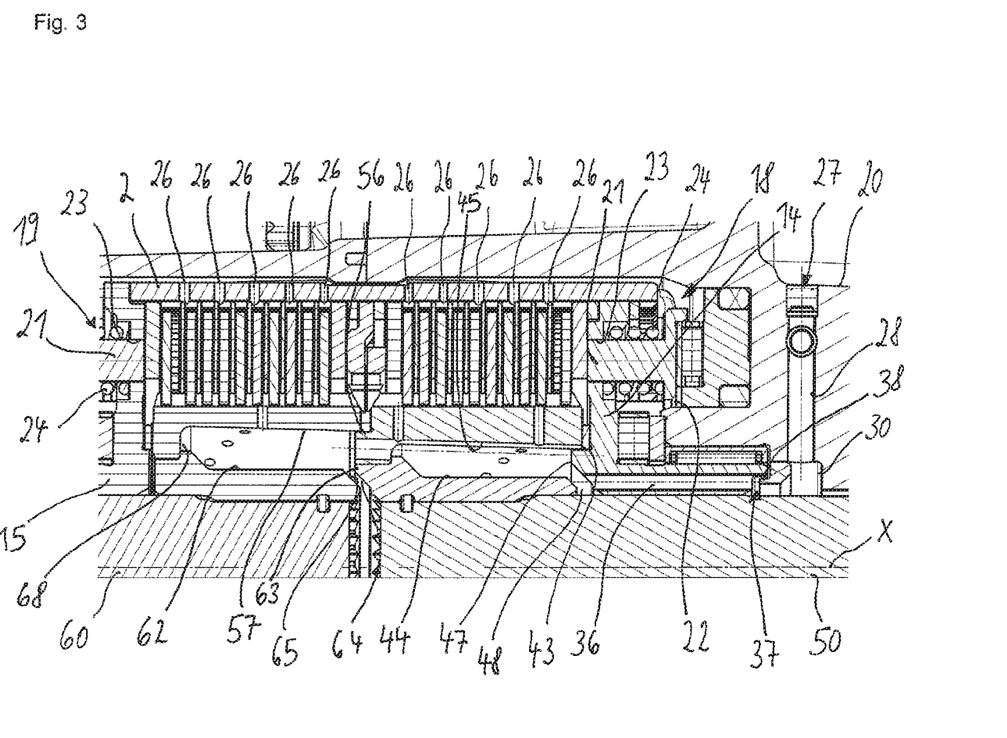
FIG. 3 shows an enlarged section of the dual clutch unit from FIG. 1 in longitudinal section.
Figure 4:
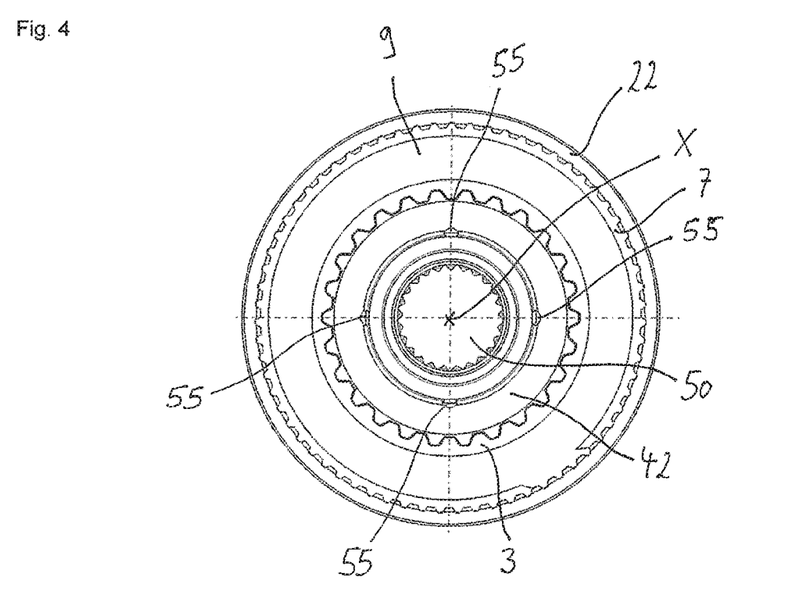
FIG. 4 shows the dual clutch unit in cross sectional.
Figure 5:
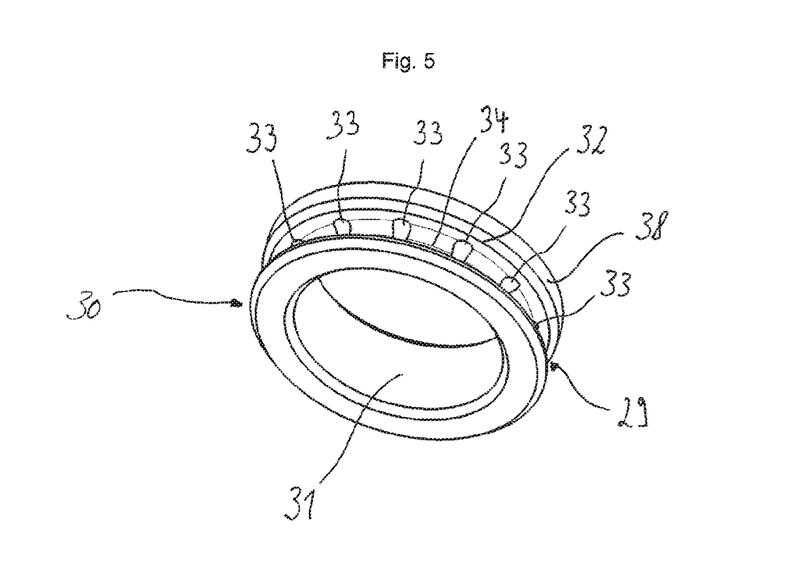
FIG. 5 shows a deflector ring of the dual clutch unit in perspective view.
Figure 6:
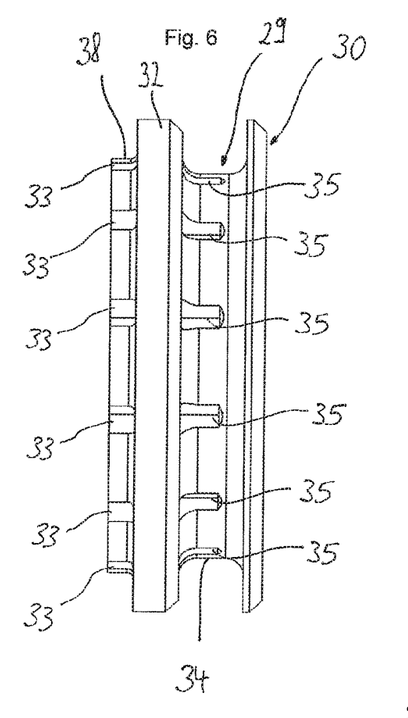
FIG. 6 shows the deflector ring from FIG. 5 in side view.

The friction clutches 5, 6 are designed as wet-running multi-disk clutches, for example. For fluid supply, the disk packs 7, 8 are supplied with coolant and/or lubricant, which is referred to as coolant, which is discharged into the clutch chamber 13 via drain channels 25', 25" designed in the inner disk carriers 3, 4. The coolant discharged from radially inside is passed through the disk packs 7, 8 by centrifugal forces and discharged radially outside via discharge channels 26 formed in the outer disk carrier 2. For instance, the respective channels 25', 25", 26 are each arranged in a base of a tooth space of the inner disk carrier 3, 4 and the outer disk carrier 2, respectively. Accordingly, the drain channels 25', 25" of the respective inner disk carrier 3, 4 can be axially offset to the discharge channels 26 in the outer disk carrier 2, as shown in FIG. 3. Due to an inclined upper side of the clutch housing 20, the coolant is discharged downwards into a sump 67. In addition, there may be a conveyor (not shown) which feeds the coolant from the sump 67 to a central oil supply 27. The coolant can, for example, be pumped by the hydraulic pump which is already used to operate the friction clutches 5, 6. Alternatively, a separate pump can be used for active delivery or a gear wheel with stripper for passive delivery.

Figure 7:
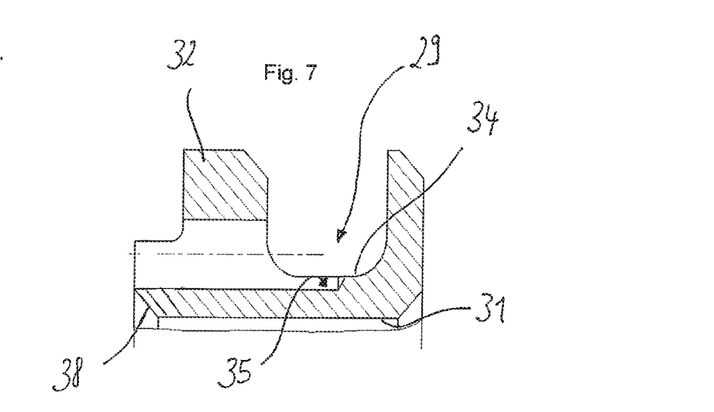
FIG. 7 shows an enlarged section of the deflector ring from FIG. 5 in longitudinal section.

The central oil supply 27 has a feed channel 28 formed in the clutch housing 20. The feed channel 28 is designed as a radial channel through which the coolant, which is by way of example pumped, flows from radially outside to radially inside. At the radially inner end of the feed channel 28 said channel 28 opens into a collecting groove 29 of a deflector ring 30, which rotates around the rotation axis X. The deflector ring 30 is shown in detail in FIGS. 5 to 7. The deflector ring 30 is inserted in a recess in the clutch housing 20 and seals the feed channel 28 to the greatest extend possible against the side shaft 50. The deflector ring 30 is fixed relative to the clutch housing 20 and has a central opening 31 to accommodate the (here, right-hand side shaft 50) with play. In a wall 32 axially delimiting the collecting groove 29 and rotating in the circumferential direction, several transfer bores 33, which are circumferentially distributed and aligned in the axial direction, are formed. FIG. 7 shows that the transfer bores 33 are positioned radially further inwards in relation to a bottom 34 of the collecting groove 29 and thus form a trough-shaped inlet area 35 in the area of the collecting groove 29.

Figure 2:
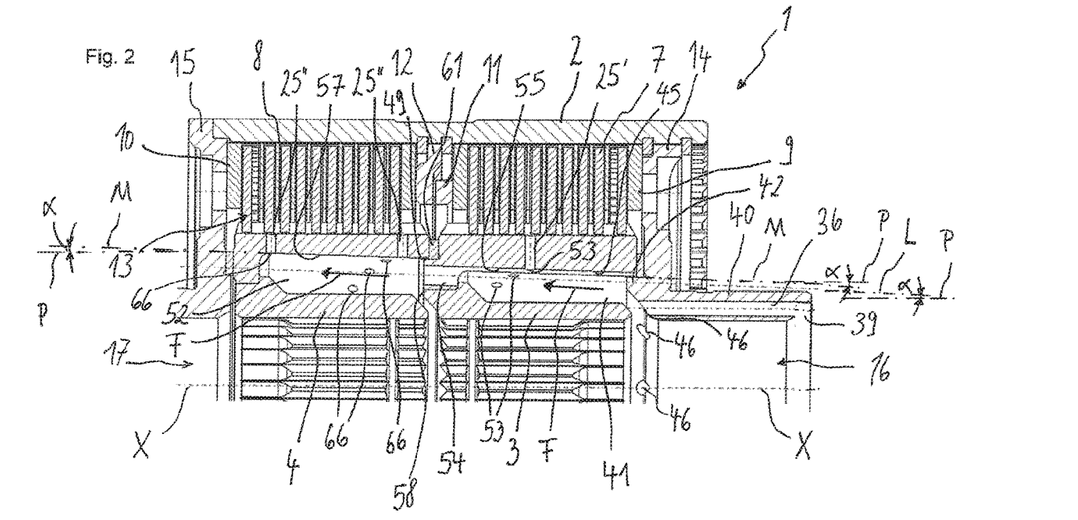
FIG. 2 shows an enlarged section of the dual clutch unit from FIG. 1.

Axially between the deflector ring 30 and the first inner disk carrier 3 is the right cover 14, which is connected to the outer disk carrier 2 so that it cannot rotate. The cover 14 has several circumferentially distributed takeover bores 36 which are axially aligned. A first rotary transmission leadthrough 37 is provided to fluidly connect the transfer bores 33 with the takeover bores 36. The first rotary transmission leadthrough 37 is formed by an axial protrusion 38 of the deflector ring 30 and by a ring chamber 39 of the cover 14 open towards the deflector ring 30. The ring chamber 39 is radially limited between a radially outer wall 40 of the cover 14 and the outer surface of the right side shaft 50. The deflector ring 30 protrudes with its axial protrusion 38 into the ring chamber 39. The transfer bores 33 of the deflector ring 30 and the takeover bores 36 of the cover 14 are arranged relative to each other such that during each revolution of the cover 14 about the rotation axis X the transfer bores 33 and the takeover bores 36 are at least once, here sixteen times, temporarily fluidly interconnected with each other. As an example, sixteen transfer holes 33 and sixteen takeover bores 36 are provided, whereby more or less than sixteen holes can also be provided. The number of transfer bores 33 may also differ from the number of takeover bores 36.

At an end facing the first inner disk carrier 3, the takeover bores 36 open into a first distributor channel 41, which is formed in the first inner disk carrier 3. The first distributor channel 41 is formed as an axially extending annular passage, which is radially bounded by a radially inner channel wall 44 of the first inner disk carrier 3 and a radially outer channel wall 45 of the first inner disk carrier 3. The cover 14 has an axial protrusion 42 which protrudes into the first distributor channel 41 through a lateral feed opening 43 of the first distributor channel 41. The feed opening 43 has a ring-shaped design. The outer radius of the protrusion 42 is correspondingly smaller than the radial distance of the radially outer channel wall 45 from the rotation axis X. A second rotary transmission leadthrough 51 is formed by the axial protrusion 42 of the cover 14 and the section of the first distributor channel 41 axially overlapping the protrusion 42 to fluidly connect the takeover bores 36 with the first distributor channel 41. In more detail, the takeover bores 36 of the cover 14 end with transfer openings 46, which are formed on an axial side of the cover 14 facing the first inner disk carrier 3. The transfer openings 46 are axially spaced from an end face 47 of the axial protrusion 42 and set back relative to it. A ring chamber 48 is formed between the face side 47 and the front side, in which the transfer openings 46 are located, through which the coolant is fed into the first distributor channel 41. The wall 40 of the cover 14 is chamfered or bevelled in the area of the ring chamber 48, with the chamfer opening towards the first distributor channel 41. The channel wall 44, which radially inner delimits the first distributor channel 41, is also chamfered, whereby the chamfer of the inner channel wall 44 runs parallel to the chamfer of the wall 40 of the ring chamber 48. The takeover bores 36 run radially further inward compared to the first distributor channel 41, so that the coolant flows into the first distributor channel 41 by centrifugal forces along the chamfered wall 40.

One surface of the radially outer channel wall 45 lies in an imaginary envelope surface that limits the first distributor channel 41 radially outside. The envelope surface is shaped frustoconical. In contrast, the radially inner channel wall 44 runs parallel to the rotation axis X. The distance of the radially outer envelope surface to the rotation axis X widens in the axial direction. In this way, the first distributor channel 41 widens radially outwards in the direction of coolant flow. The flow direction is indicated in FIG. 2 with the arrow F. When the dual clutch unit 1 is in operation, the centrifugal force on the radially outer channel wall 45 conveys the coolant through the first distributor channel 41 to a second distributor channel 52. An aperture angle α between envelope lines M of the envelope surface and the rotation axis X is, for example, about 2 degrees, whereby the aperture angle α may preferably open in the flow direction F of the coolant, i.e. in a direction towards the second distributor channel 52. FIG. 2 shows the aperture angle α between one of the envelope lines M and the rotation axis X on the basis of a parallel projection P of the rotation axis X.

In the radially outer channel wall 45 of the first distributor channel 41, outlet openings 53 are formed which open into the drain channels 25' of the first distributor channel 41. The outlet openings 53 are arranged on an imaginary spiral arranged concentric to the rotation axis X. The diameter of the respective outlet openings 53 increases in flow direction F. Correspondingly, the outlet opening 53 nearest to the feed opening 43 has the smallest diameter and the outlet opening 53 farthest from the feed opening 43 has the largest diameter. The diameter of the respective discharge channels 26 in the outer disk carrier 2 can also be designed accordingly in order to prevent local undersupply, oversupply or jam of the coolant or lubricant. For instance, at least a subset of the discharge channels 26 along the first disk pack 7 may have a smaller diameter than at least a subset of the discharge channels 26 along the second disk pack 8.

The first distributor channel 41 opens into several through-bores 54, which are distributed in the circumferential direction. The through-bores 54 are formed in the first inner disk carrier 3. A longitudinal axis L of the respective through-bores 54 forms an angle with the rotation axis X that corresponds to the aperture angle α. In the radially outer channel wall 45 of the first distributor channel 41, several circumferentially spaced recesses 55 are provided. The recesses 55 extend in the axial direction, whereby the recesses 55 start at the feed opening 43 and each of the recesses 55 ends in one of the through-bores 54, preferably flush therewith. The recesses 55 have a constant depth over their length. For example, four of the through-bores 54 and four of the recesses 55 in the first inner disk carrier 3 are shown here.

The through-bores 54 extend through an axial protrusion 56 of the first inner disk carrier 3, which projects into the second distributor channel 52 through a ring opening 49 of the second inner disk carrier 4, which is concentric to the rotation axis X. The second distributor channel 52 is formed as an axially extending annular passage which is bounded by a radially inner channel wall 62 of the second inner disk carrier 4 and a radially outer channel wall 57 of the second inner disk carrier 4. The outer radius of the protrusion 56 is smaller than the radial distance of the radially outer channel wall 57 of the second distributor channel 52 from the rotation axis X. The through-bores 54 end at one end 58 of the axial protrusion 56 and thus lead into the second distributor channel 52. The axial protrusion 56 of the first inner disk carrier 3 and the section of the second distributor channel 52 axially overlapping the protrusion 56 thus form a third rotary transmission leadthrough 59 to fluidly connect the through-bores 54 with the second distributor channel 52. To seal the third rotary transmission leadthrough 59 radially outwards, a ring 61 is pushed onto the axial protrusion 56 of the first inner disk carrier 3. The second inner disk carrier 4 is supported axially on the first inner disk carrier 3 via the ring 61. Therefore, the ring 61 can also be referred to as a spacer. The ring 61 has a sliding surface and can be a bronze ring, for example. The radially inner channel wall 62 of the second distributor channel 52 and an outer wall 63 of the protrusion 56 of the first inner disk carrier 3 facing the inner channel wall 62 have chamfers 64, 65 in opposite directions. The chamfers 64, 65 are axially spaced from each other, whereby the axial distance corresponds at least approximately to the thickness of the ring 61.

One surface of the radially outer channel wall 57, which limits the second distributor channel 52 radially on the outside, lies in an imaginary envelope surface. Like that of the first distributor channel 41, the envelope surface is frustoconical in shape. The radially inner channel wall 62 runs parallel to the rotation axis X. In this way, the second distributor channel 52 also widens radially outwards in the coolant flow direction. The flow direction is indicated in FIG. 2 with the arrow F. Due to the distance of the radially outer envelope surface to the rotation axis X, which increases in the axial direction, the coolant is conveyed through the second distributor channel 52 along the centrifugal force on the radially outer channel wall 62. The aperture angle α between envelope lines M of the envelope surface of the second distributor channel 52 and the rotation axis X and the aperture angle α between envelope lines M of the envelope surface of the first distributor channel 41 and the rotation axis X is, in this case, identical, i.e. about 2 degrees. Both aperture angles α open in flow direction F of the coolant.

In the radially outer channel wall 57 of the second distributor channel 52, there are also outlet openings 66 which open into the drain channels 25" in the second inner disk carrier 4. The outlet openings 66 are arranged on an imaginary spiral concentric to the rotation axis X. The diameter of the respective outlet openings 66 increases in flow direction F. Accordingly, the outlet opening 66 closest to the ring opening 49 has the smallest diameter, whereas the outlet opening 66 furthest away from the ring opening 49 has the largest diameter.

The second distributor channel 52 is closed at an end 68 facing away from the ring opening 49. Thus, when the second inner disk carrier 4 rotates, the coolant flowing through the second distributor channel 52 leaves said channel only via the drain channels 25" to lubricate the second disk pack 8.

During operation, the coolant is pumped from the sump 67 to the central oil supply 27, for example by means of an oil pump (not shown), and there it is pumped radially inwards through the feed channel 28 formed in the clutch housing 20. From the open end of the feed channel 28, the coolant flows into the collecting groove 29 of the deflector ring 30 and is axially deflected there by the axially aligned transfer bores 33. The coolant flows through the first rotary transmission leadthrough 37 into the takeover bores 36, which are designed in the right cover 14 and which rotate about the rotation axis X when the outer disk carrier 2 is rotated. At the axial end of the takeover bores 36 facing the first inner disk carrier 3, the coolant flows through the second rotary transmission leadthrough 51 into the first distributor channel 41. When the first inner disk carrier 3 rotates about the rotation axis X, the coolant is pressed against the radially outer channel wall 45 due to the centrifugal forces and flows through the first distributor channel 41, which widens in the axial direction, in a direction towards the through bores 54. A first partial quantity of the coolant flows through the outlet openings 53 arranged on the imaginary spiral into the drain channels 25' to lubricate the first disk pack 7. A second partial quantity of the coolant is fed directly to the through-bores 54 via the trough-like recesses 55. No outlet openings 53 to the drain channels 25' are formed in the recesses 55. The second partial quantity of the coolant is thus pressed through the through-bores 54 via the third rotary transmission leadthrough 59 into the second distributor channel 52. When the second inner disk carrier 4 rotates about the rotation axis X, the coolant is pressed against the radially outer channel wall 57 due to the centrifugal forces and flows through the second distributor channel 52, which widens in the axial direction, in a direction towards the closed end 68 of the second distributor channel 52. On the way there, the coolant flows through the outlet openings 66, which are arranged on the imaginary spiral, into the drain channels 25" to lubricate the second disk pack 8. Then, as the first inner disk carrier 3 or the second inner disk carrier 4 rotates, the coolant flows through the respective disk packs 7, 8 and returns to the sump 67 at the radially outer end of the clutch chamber 13 through the discharge channels 26 formed in the outer disk carrier 2. For this purpose, the coolant flowing out of the discharge channels 26 can be led into the sump 67 along a housing wall of the stationary clutch housing 20.

Figure 8:
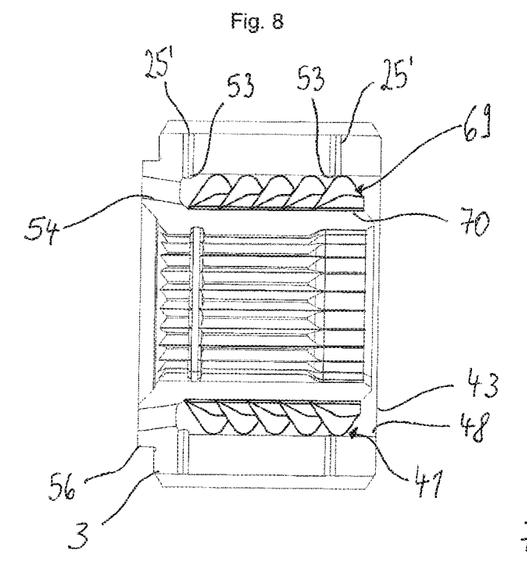
FIG. 8 shows an enlarged section of another example dual clutch unit in longitudinal section.

FIG. 8 shows an enlarged section of another example of a dual clutch unit. This example basically corresponds to that shown in FIGS. 1 to 7, whose description is referred to in this respect. The same details are marked with the same reference signs as in FIGS. 1 to 7. In FIG. 8, the first inner disk carrier 3 is shown in detail to illustrate the only difference compared to the version according to FIGS. 1 to 7.

It can be seen that the radially outer channel wall 45 of the first distributor channel 41 runs parallel to the rotation axis X and thus also parallel to the radial inner channel wall 44 of the first distributor channel 41. Furthermore, an archimedean screw 69 is inserted into the first distributor channel 41, which is connected to the first inner disk carrier 3 in a rotationally fixed manner. When the first inner disk carrier 3 rotates during operation of the dual clutch unit, the coolant flowing through the feed opening 43 into the first distributor channel 41 is conveyed by the archimedean screw 69 towards the through-bores 54, using the well known principle of a worm pump.

Figure 9:
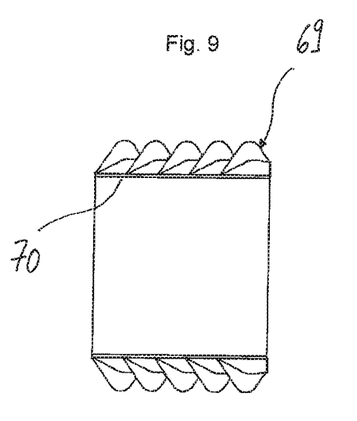
FIG. 9 shows an archimedean screw shown in FIG. 8 in longitudinal section.

The archimedean screw 69 is shown in FIG. 9 in detail to illustrate its construction. The archimedean screw 69 has a cylindrical hole 70 so that the archimedean screw 69 can be inserted through the feed opening 43 into the first distributor channel 41. The inner diameter of the cylindrical bore 69 corresponds, at least approximately, to the outer diameter of the radially inner channel wall 44. The outer diameter of the archimedean screw 69 corresponds, at least approximately, to the inner diameter of the radially outer channel wall 45. Chambers are formed between the individual blade sections of the archimedean screw 69, in which the coolant can be pumped towards the through-bores 54. The coolant is also led along the drain channels 25', through which a partial quantity of the coolant discharges into the clutch chamber 13 to lubricate the first disk pack 8. Optionally, the recesses 55 known from the example as shown in FIGS. 1 to 7 can also be used together with the archimedean screw 69.

Similarly, the second inner disk carrier 4 can also have an archimedean screw 69. In this way, when the second inner disk carrier 4 rotates, the coolant flowing in during operation from the first distributor channel 41 via the through-bores 54 into the second distributor channel 52 can be fed to the drain channels 25" in the second inner disk carrier 4 to lubricate the second disk pack 8.

Figure 10:
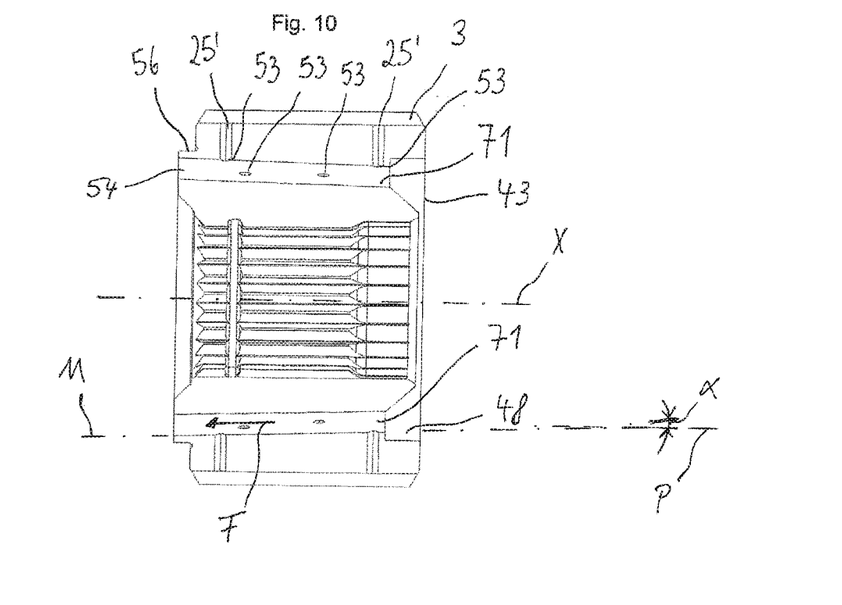
FIG. 10 shows an enlarged section of another example dual clutch unit in longitudinal section.

FIG. 10 shows an enlarged section of another example of a dual clutch unit. This example corresponds basically with the example shown in FIGS. 1 to 7, whose description is referred to in this respect. The same details are marked with the same reference signs as in FIGS. 1 to 7. In FIG. 10, the first inner disk carrier 3 is shown in detail to illustrate the only difference compared to the example according to FIGS. 1 to 7.

The first inner disk carrier 3 distinguishes by the fact that several first distributor channels 71 are provided. The first distributor channels 71 are designed as bores and are arranged distributed around the rotation axis X in the circumferential direction. The first distributor channels 71 extend from the feed opening 43, which is shaped as an annular gap, to the individual through-bores 54. Each of the first distributor channels 71 opens into one of the through-bores 54 assigned to the respective first distributor channel 71. It may be preferred that both the first distributor channel 71 and the respective through-bore 54 forms a continuous through bore with a common borehole longitudinal axis A. The respective borehole longitudinal axis A encloses an aperture angle $\alpha$ with the rotation axis X, which in by way of example about 2 degrees. The aperture angle $\alpha$ may preferably open in the flow direction F of the coolant, i.e. in a direction away from the feed opening 43. In the first distributor channels 71 at least one drain channel 25' is provided. For example, each of the first distributor channels 71 have several of the drain channels 25'. In particular, the drain channels 25' may be arranged on an imaginary spiral extending across all first distributor channels 71. The drain channels 25' can be aligned radially or skew to the rotation axis X. Optionally, the recesses 55 in the individual first distributor channels 71, which are known from the example as shown in FIGS. 1 to 7, can also be used to convey a partial quantity of coolant along the drain channels 25' to the through-bores 54.

Similarly, the second inner disk carrier 4 can also have several of the boreholes distributed around the rotation axis X in the circumferential direction, which form the second distributor channels. The second distributor channels are then closed at the ends 68 facing away from the first inner disk carrier 3, just like the second distributor channel 52 according to the example shown in FIGS. 1 to 7. Thus, when the second inner disk carrier 4 rotates, the coolant can flow out of the second distributor channels only via the drain channels 25" into the second disk pack 8.

REFERENCE SIGNS LIST 1 dual clutch unit
2 outer disk carrier
3 inner disk carrier
4 inner disk carrier
5 friction clutch
6 friction clutch
7 disk pack
8 disk pack
9 pressure plate
10 pressure plate
11 supporting element
12 supporting element
13 clutch chamber
14 cover
15 cover
16 opening
17 opening
18 actuator unit
19 actuator unit
20 clutch housing
21 piston
22 piston chamber
23 opening
24 return spring
25 drain channel
26 discharge channel
27 central oil supply
28 feed channel
29 collecting groove
30 deflector ring
31 opening
32 wall
33 transfer bore
34 bottom
35 inlet region
36 takeover bore
37 first rotary transmission leadthrough
38 protrusion
39 ring chamber
40 wall
41 first distributor channel
42 protrusion
43 feed opening
44 inner channel wall 45 outer channel wall
46 transfer opening
47 front face
48 ring chamber
49 ring opening
50 side shaft
51 second rotary transmission leadthrough
52 second distributor channel
53 outlet opening
54 through-bore
55 recess
56 protrusion
57 outer channel wall
58 front face
59 third rotary transmission leadthrough
60 side shaft
61 ring
62 inner channel wall
63 outer wall
64 chamfer
65 chamfer
66 outlet opening
67 sump
68 end
69 archimedean screw
70 bore
71 distributor channel
α aperture angle
A borehole longitudinal axis
F flow direction
L borehole longitudinal axis
M envelope line
P parallel projection
X rotation axis

The invention claimed is:

1. A dual clutch unit for variable torque distribution on two output shafts, comprising:
    an outer disk carrier rotationally driven about a rotation axis;
    a first inner disk carrier;
    a first disk pack for torque transmission between the outer disk carrier and the first inner disk carrier;
    a second inner disk carrier, wherein the first inner disk carrier and the second inner disk carrier are arranged rotatably relative to each other about the rotation axis;
    a second disk pack for torque transmission between the outer disk carrier and the second inner disk carrier;
    a central oil supply to supply the first disk pack and the second disk pack with coolant;
    a first distributor channel in the first inner disk carrier, the first distributor channel comprising a feed opening through which the first distributor channel is fluidly connected to the central oil supply;
    a second distributor channel in the second inner disk carrier, the second distributor channel being fluidly connected to the central oil supply via the first distributor channel; and
    drain channels in the first inner disk carrier to conduct the coolant into the first disk pack and in the second inner disk carrier to conduct the coolant into the second disk pack;
    wherein the first inner disk carrier comprises at least one through-bore through which the second distributor channel is fluidly connected to the first distributor channel; and
    wherein a borehole longitudinal axis of the at least one through-bore encloses a bore angle with the rotation axis, which is between 0.01 degrees and 10 degrees.

2. The dual clutch unit according to claim 1,
    wherein the first inner disk carrier comprises an axial protrusion with the at least one through-bore, wherein the protrusion projects into the second distributor channel and the second distributor channel is designed as an axially extending annular passage at least in a region of axial overlap with the protrusion.

3. The dual clutch unit according to claim 1,
    wherein guiding means are formed in the first distributor channel for guiding a partial quantity of the coolant towards the at least one through-bore.

4. The dual clutch unit according to claim 3,
    wherein the guiding means comprise at least one elongated recess extending over at least 20 percent of an axial longitudinal extension of the first distributor channel and opening into the at least one through-bore.

5. The dual clutch unit according to claim 1,
    wherein the first inner disk carrier and the second inner disk carrier are axially supported against each other.

6. The dual clutch unit according to claim 1,
    wherein the first distributor channel and the second distributor channel are each designed as an annular passage extending in the axial direction and being concentrically arranged to the rotation axis.

7. The dual clutch unit according to claim 1,
    further comprising outlet openings in a radially outer channel wall of the first distributor channel and in a radially outer channel wall of the second distributor channel, the outlet openings leading to the drain channels, wherein the outlet openings are arranged on an imaginary spiral arranged concentrically to the rotation axis.

8. The dual clutch unit according to claim 7,
    wherein at least a subset of the outlet openings in the first distributor channel comprises a smaller diameter than at least a subset of the outlet openings in the second distributor channel.

9. The dual clutch unit according to claim 1,
    wherein an envelope surface delimiting the first distributor channel radially outside and an envelope surface delimiting the second distributor channel radially outside are designed frustoconically.

10. The dual clutch unit according to claim 9,
    wherein an aperture angle between envelope lines of the respective envelope surface and the rotation axis is between 0.01 degrees and 10 degrees and that the respective aperture angle opens in flow direction of the coolant.

11. The dual clutch unit according to claim 1,
    wherein the outer disk carrier comprises a plurality of discharge channels for discharging the coolant, wherein at least a subset of the discharge channels along the first disk pack has a smaller diameter than at least a subset of the discharge channels along the second disk pack.

12. The dual clutch unit according to claim 1,
    wherein a deflector ring is fluidly connected on its inlet side to the central oil supply and on its outlet side to the first distributor channel, wherein the deflector ring has a collecting groove that is circumferentially open and a plurality of transfer bores, which are circumferentially distributed and at least substantially axially aligned and fluidly connected to the collecting groove.

13. The dual clutch unit according to claim 12,
wherein a cover is non-rotatably arranged laterally on the outer disk carrier and has a plurality of takeover bores, which are circumferentially distributed about the rotation axis and fluidly connected to the first distributor channel, wherein the takeover bores of the cover and the transfer bores of the deflector ring are arranged relative to each other such that during each revolution of the cover about the rotation axis the transfer bores and the takeover bores at least once are temporarily fluidly interconnected with each other.

14. The dual clutch unit according to claim 13,
wherein the cover of the outer disk carrier projects into the first distributor channel providing a rotary transmission leadthrough between the takeover bores of the cover and the first distributor channel of the first inner disk carrier.

15. A drive assembly for driving a drive axle of a motor vehicle, comprising:
 a drive engine with a motor shaft,
 two output shafts arranged concentrically to each other; and
 a clutch unit arranged in a power path between the drive engine and the two output shafts,
 wherein the clutch unit is a dual clutch unit for variable torque distribution on the two output shafts, comprising:
   an outer disk carrier rotationally driven about a rotation axis,
   a first inner disk carrier,
   a first disk pack for torque transmission between the outer disk carrier and the first inner disk carrier,
   a second inner disk carrier, wherein the first inner disk carrier and the second inner disk carrier are arranged rotatably relative to each other about the rotation axis,
   a second disk pack for torque transmission between the outer disk carrier and the second inner disk carrier,
   a central oil supply to supply the first disk pack and the second disk pack with coolant,
   a first distributor channel in the first inner disk carrier, the first distributor channel comprising a feed opening through which the first distributor channel is fluidly connected to the central oil supply,
   a second distributor channel in the second inner disk carrier, the second distributor channel being fluidly connected to the central oil supply via the first distributor channel, and
   drain channels being formed in the first inner disk carrier to conduct the coolant into the first disk pack and in the second inner disk carrier to conduct the coolant into the second disk pack;
 wherein the motor shaft rotatingly drives the outer disk carrier;
 wherein a first output shaft of the two output shafts is non-rotatably connected to the first inner disk carrier and a second output shaft of the two output shafts is non-rotatably connected to the second inner disk carrier;
 wherein the first inner disk carrier comprises at least one through-bore through which the second distributor channel is fluidly connected to the first distributor channel; and
 wherein a borehole longitudinal axis of the at least one through-bore encloses a bore angle with the rotation axis, which is between 0.01 degrees and 10 degrees.

* * * * *